United States Patent [19]

Steadly et al.

[11] Patent Number: 4,770,777
[45] Date of Patent: Sep. 13, 1988

[54] MICROPOROUS ASYMMETRIC POLYAMIDE MEMBRANES

[75] Inventors: Harvey Steadly, Westport; Anthony J. Laccetti, Shelton, both of Conn.

[73] Assignee: Parker Hannifin Corporation, Cleveland, Ohio

[21] Appl. No.: 8,227

[22] Filed: Jan. 29, 1987

[51] Int. Cl.$^4$ .............................................. B01D 13/00
[52] U.S. Cl. .................. 210/490; 210/500.38; 427/246
[58] Field of Search .................... 55/16, 158; 210/638, 210/654, 490, 500.38; 264/41, 46.4, 45.1, 49; 427/246

[56] References Cited

U.S. PATENT DOCUMENTS 4,623,463  11/1986  Ford et al. ................ 210/500.38 X
4,707,265  11/1987  Barnes, Jr. et al. ................ 210/638

*Primary Examiner*—Frank Spear
*Attorney, Agent, or Firm*—Lyon & Lyon

[57] ABSTRACT

Integral gradient, skinned, submicroscopically porous, anisotropic, hydrophilic, asymmetric polyamide membranes comprising:

(a) a first porous polyamide zone obtained from a polyamide solution formulated to give coagulated film with pores of a given size,
(b) a fabric support imbedded in the first porous polyamide layer, and
(c) a second porous polyamide zone having a skinned outer surface, obtained from a polyamide solution having the same constituents as the solution used to form the first porous polyamide zone but solution post-treated to give pores substantially smaller than those in the first porous polyamide zone, as well as a process for producing such membranes, are disclosed.

12 Claims, 6 Drawing Sheets

FIG. 7. COATING END OF PROTOTYPE CASTING MACHINE

FIG. 8.

MICROPOROUS ASYMMETRIC POLYAMIDE MEMBRANES

BACKGROUND OF THE INVENTION

1. Field of the Invention

This invention relates to novel microporous asymmetric polyamide membranes. More particularly, this invention relates to novel integral gradient, submicroscopically porous, anisotropic, hydrophilic, polyamide membranes which are asymmetric in pore size, i.e., which have an increasing gradation in average pore diameter from one surface of the membrane to the other. These membranes are particularly useful as microfilters, and especially as the filtration components of microfiltration cartridges, which can be used to remove fine particle size contaminants having diameters as small as about 0.01 μm from fluids such as those encountered in the electronics and pharmaceutical industries. For example, these novel membranes can be used in cold sterilization processes to remove bacterial contaminants, and to remove fine particle contaminants from fluids used in the manufacture of microchips. This invention also relates to a novel process for preparing these microporous asymmetric polyamide membranes.

2. Description of the Prior Art

Porous polyamide membranes or films, and various processes for their preparation, including both "dry" and "wet" processes, have been known for many years.

Microporous polyamide membranes characterized by being "skinless" and consequently unlike prior art skinned microporous polyamide membranes are disclosed in U.S. Pat. Nos. 4,340,379 and 4,340,380 to Pall. And, among the patents acknowledged by Pall as disclosing prior art skinned membranes are U.S. Pat. Nos. 3,615,024 to Michaels and 3,876,738 to Marinaccio et al.

In U.S. Pat. No. 4,595,503 to Schlindler et al, polyamide membranes are disclosed which are said to be suitable for use in ultrafiltration applications, i.e., filtration of high molecular weight (macromolecular) substances. These membranes are made up of an ultrafiltration skin formed by subjecting a membrane-forming polyamide solution in formic acid (in which the minimum concentration of formic acid is 75%), cast or spread onto a carrier film, to a dwell time of a few seconds in ambient air before immersion in a coagulating and washing bath, and a backing layer, i.e., that portion of the initially cast or spread membrane-forming polyamide solution which has not formed the ultrafiltration skin, whose pore size increases with increasing distance from the ultrafiltration skin.

The Schindler et al patent teaches that these membranes, after being coagulated and washed, must be stretched in at least one direction before they are dried to ". . . increase [their] strength and allow adjustment of the pore size".

The problem inherent in Schindler et al's membranes and the process by which they are prepared, especially if one were to attempt to practice this process commercially, is this stretching Schlinder et al's unsupported thin membranes could easily damage them, and give unacceptably large pores or tears on the backing layer side or even in the ultrafiltration skin.

Microporous polyamide "breathable" structures which are permeable to gases, including water vapor, prepared by distributing a layer of a polyamide resinous solution over a woven, knit or felted fabric, cooling the resulting composite and then removing the solvent are disclosed in U.S. Pat. No. 3,427,179 to Davis.

The above-mentioned Pall patents also disclose:

". . . [skinless] polyamide resin membranes that are supported by the substrate on which the polyamide resin membrane is formed, either imbedded therein, or having the substrate attached to one face thereof", or ". . . [skinless] microporous polyamide resin membrane composites having a plurality of polyamide resin membrane layers, formed of membranes prepared separately by precipitation on separate substrates and then bonded together by drying two or more layers maintained in close contact";

see, e.g., U.S. Pat. No. 4,340,479 at column 12, lines 5–15.

Skinned polyamide resin microporous asymmetric membranes, however, offer the following advantages over skinless polyamide resin membrane symmetric composites such as those disclosed in the Pall patents: (1) higher flux rates for a given porosity; (2) improved skin dynamics; (3) superior dirt holding capacity; and (4) longer service life.

There is a need for chemically and physiologically inert skinned microporous asymmetric polyamide membranes whose pore structures render them particularly suitable for microfiltration applications and whose method of preparation does not give rise to the likelihood that the membrane, or its pore structure, will be damaged during preparation.

It is an object of this invention to provide novel microporous asymmetric polyamide membranes.

It is also an object of this invention to provide novel microporous asymmetric polyamide membranes useful as filtration means.

It is a further object of this invention to provide novel integral gradient microporous polyamide membranes in which the pore sizes along the gradient may be precisely selected.

Another object of this invention is to provide novel integral gradient, skinned, submicroscopically porous, anisotropic, hydrophilic, asymmetric polyamide membranes, whose unique pore structure, high porosity, high strength, high flux and superior dirt holding capacity make them particularly useful as microfilters, and especially as the filtration components of microfiltration cartridges, which can be used to remove fine particle size contaminants from fluids such as those encountered in the electronics and pharmaceutical industries.

A still further object of this invention is to provide a novel process for preparing these microporous asymmetric polyamide membranes.

These and other objects, as well as the nature, scope and utilization of the invention, will become readily apparent to those skilled in the art from the following description, the drawings and the appended claims.

SUMMARY OF THE INVENTION

The novel microporous asymmetric polyamide membranes of this invention are prepared by:

1. Casting a layer of a first polyamide solution, formulated to give a coagulated film with pores of a given size, onto a moving, continuous solid support from which the membrane will subsequently be separated.

2. Applying a fabric support to the upper surface of this first polyamide solution layer prior to solidification of this layer on the moving, continuous solid support, and subsequently forcing this polyamide solution from between the continuous solid support and the fabric support up, into and through the fabric support, resulting in the fabric support becoming imbedded in the first polyamide solution layer.

3. Casting a layer of a second polyamide solution on top of the first polyamide solution/fabric support composite. The polyamide solution used to form this second polyamide solution layer is made up of the same polyamide polymer type used in the first polyamide solution, contains the same solvents in the same amounts as the first polyamide solution, and is prepared using the same master batching technique as that used to prepare the first polyamide solution. The second polyamide solution, however, will have been subjected to a solution post-treatment so as to give a film having pore diameters substantially smaller, e.g., 5 to 100 times smaller, than those in the portion of the microporous asymmetric polyamide membrane resulting from the first polyamide solution layer.

4. Coagulating and washing the resulting composite to give the finished integral gradient membrane with the fabric support imbedded therein.

5. Separating the continuous solid support from the composite.

6. Washing the separated membrane to remove all or at least a preponderance of the coagulation solution.

DETAILED DESCRIPTION OF THE INVENTION

As indicated above:

The same polyamide polymer type used in the first membrane-forming solution will be used as all or a preponderant amount of the second solution.

Both solutions will contain essentially the same additional constituents, i.e. the preferable multicomponent solvent systems and adjuvants described herein below.

Both solutions will be prepared using the same or similar techniques. The second polyamide solution is, however, additionally solution post-treated.

Any thermoplastic alcohol-soluble or -insoluble polyamide (nylon) can be used in making the microporous asymmetric polyamide membranes of this invention, including, but not limited to, nylon 4, nylon 4/6, nylon 6, nylon 6/6, nylon 6/10, nylon 6/12, nylon 11, nylon 12 and the like, with nylon 6/6 being preferred for use as all or a preponderant amount of the polyamide in the first and second membrane-forming solutions.

Master batches of polyamide polymer solutions are prepared for use in practicing this invention by first dissolving the polyamide in an amount of aqueous formic acid sufficient to dissolve the polymer at a temperature of from about 35° C. to about 70° C., and preferably at from about 35° C. to about 50° C. Aqueous formic acid of from about 85% to about 98% concentration, preferably of from about 95% to about 98% concentration, can be used for this purpose, and will be used in an amount sufficient to insure complete dissolution of the polyamide. Additional amounts of the remainder of the solvent system are added to the prepared initial polyamide/aqueous formic acid solution in a manner calculated to ensure an unprecipitated, visibly clear, completely dissolved solution during the entire process. This may be achieved by maintaining an excess of the polyamide polymer solution. The solvent system should be continously added in small amounts, such as through the use of an atomizer nozzle, since an excess of solvent will result in the formation of a precipitate.

The solvent system consists of a formic acid and water solution which may further contain an aliphatic alcohol cosolvent such as ethanol, propanol or isopropanol, as well as salts, such as lithium chloride and calcium chloride.

A preferred polymer solution comprises:

| Component | Weight Percent[1] |
|---|---|
| Nylon 6/6 | 16.5 |
| Formic acid | 56.0 |
| Water | 17.0 |
| Lithium chloride | 2.5 |
| Isopropanol | 8.0 |

[1]Based on total weight of solution.

This preferred polymer solution is used as both the first and second casting solutions. One portion is introduced directly onto the casting machine and cast at or near the master batch solution temperature, at about 50° to 80° C., without intervening solution temperature changes. A second portion is post-treated and then introduced onto the casting machine as the second casting solution.

Typically this post-treatment involves cooling the clear, warm master batch solution, generally at a rate of from about 0.5° C. to about 5° C. per minute, preferably from about 1° C. to about 2° C. per minute for batch processes and from about 3° C. to about 4° C. per minute for continuous processes, with stirring, from the temperature at which it was formed, i.e., a temperature of from about 50° C. to about 80° C., and preferably a temperature of from about 65° C. to about 75° C., until at least a discernible turbidity is observed, indicating the formation of a precipitate. The temperature at which turbidity first becomes visible will generally be from about 45° C. or less to about 55° C.

The cool, turbid, solution is then reheated, with stirring, until the point is reached at which very little or no visible precipitate remains. Generally this will be accomplished by heating, generally at a rate of from about 1° C. to about 4° C. per minute, to a temperature of from about 50° C. to about 80° C., and preferably to a temperature of from about 55° C. to about 70° C., for from about 15 to about 30 minutes. The post-treated solution is then used as the second casting solution which provides the skin surface of the microporous asymmetric polyamide membrane. This skin surface normally has surface pores about 5 to about 100 times smaller in average diameter, and preferably from about 5 to about 60 times smaller, than those in the remainder of the membrane which results from the first portion of the casting solution.

Figure 1:
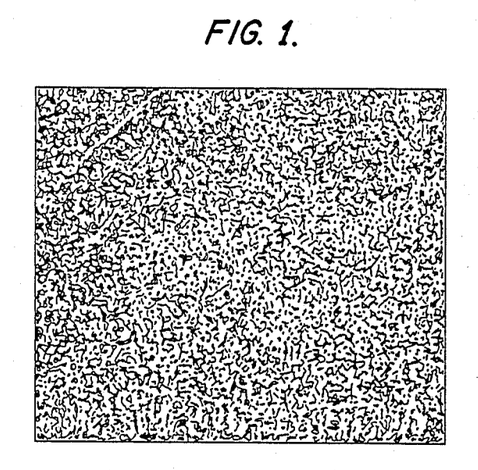
FIGS. 1 and 2 are photomicrographs (150033 and 5000× magnification, respectively) of the top surface of a microporous asymmetric polyamide membrane produced in accordance with the teachings of this invention.
Figure 2:
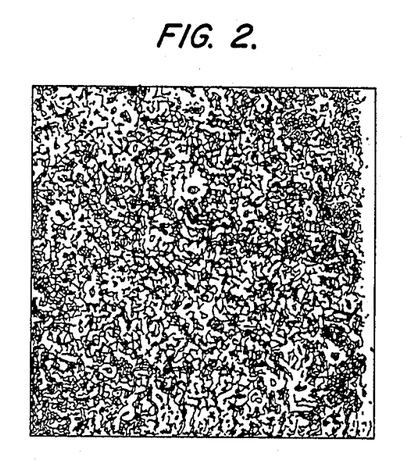
Figure 3:
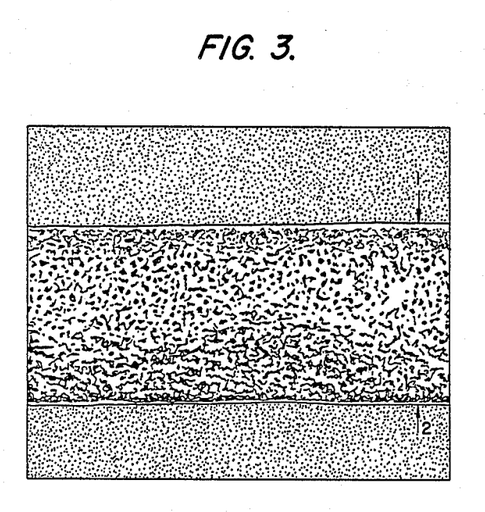
FIG. 3 is a photomicrograph (500× magnification) of the cross-section of the membrane of FIGS. 1 and 2.
Figure 4:
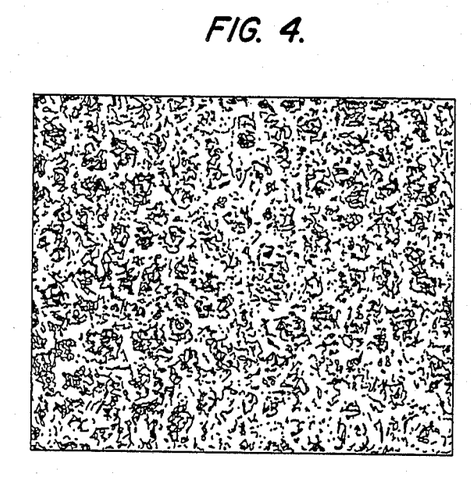
FIGS. 4 and 5 are photomicrographs (1500× and 5000×, respectively) of the bottom surface of the membrane of FIGS. 1 and 2.
Figure 5:
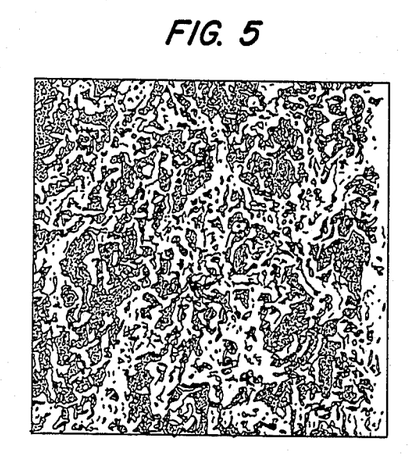
Figure 6:
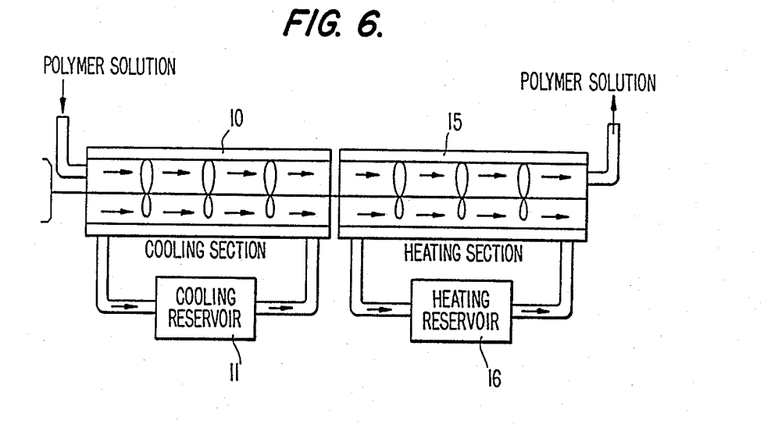
FIG. 6 is a schematic illustration of a two zone tubular vessel usable in post-treating solution for the second polymer solution used in the casting process in accordance with this invention.

Preferably, the post-treatment is carried out in a two zone tubular vessel such as that illustrated schematically in FIG. 6, having a cooling section 10 followed by a heating section 15.

The cooling section 10 is cooled using a cooling medium, such as one recirculating through the vessel jacket and cooling reservoir 11. The heating section 15 is heated by recirculating a heating medium, hot water, for example, through the vessel jacket and heating reservoir 16. Each of these sections contains a rotating flat blade 18 wiping the outer cooled or heated surface to assist heat transfer.

Figure 7:
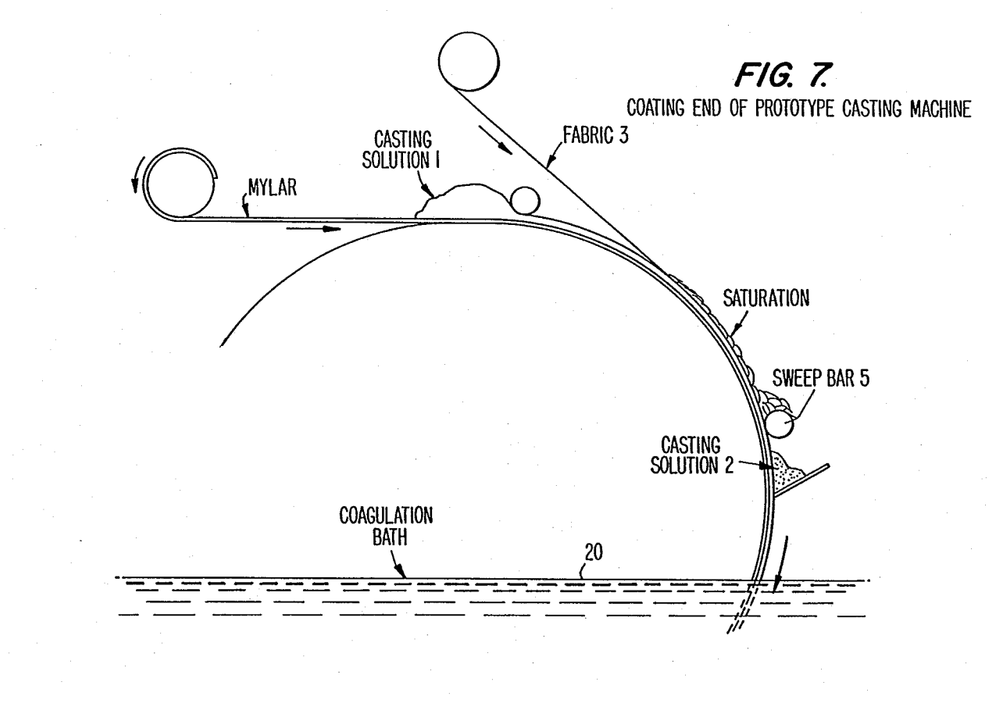
FIG. 7 is a schematic illustration of apparatus usable in laying up the aforementioned first polyamide solution layer, fabric support and second polyamide solution layer.

The moving, continuous solid support 4 onto which the layer of the first polyamide solution is cast can be any flexible film or other nonporous material. Polyethylene terephthalate or other such solid polymer films are preferred for this purpose. The solid support is preferably of a uniform thickness to aid in formation of a membrane of uniform thickness.

The fabric support 3 applied to the first polyamide solution layer prior to the solidification of this layer can be any woven, knit or felted fabric of sufficient porosity and thinness to permit it to be forced into the polyamide solution layer. Particularly preferred fabric supports are nonwoven fabrics such as calendared DuPont "Remay" spun bonded polyethylene terephthalate fabric having a nominal weight of 0.5 to 2.0 ounces per square yard, a thickness of 1.5 to 5.5 mils and an air permeability of 600 to 700 CFM/air.

The fabric support is laid on top of the cast first polyamide solution layer. The tension on the fabric support causes the first polyamide solution layer to saturate the fabric support and a portion of the first polyamide solution layer to collect on top. Sweep bar 5, or an equivalent thereof, such as a doctor blade, is used to make the solution layer/fabric support composite a particular desired thickness by removing the excess first polymer solution layer.

The second polyamide solution 2, after being subjected to post-treatment, is cast onto the first polyamide solution layer/fabric support composite. This casting process is illustrated in FIG. 7.

The resulting composite is then subjected to a coagulation step which results in the formation of an integral, gradient microporous asymmetric polyamide membrane having a continuum of pore sizes. Although in the process of preparing the membrane the casting solutions are layered, the resultant membrane is not a layered product but rather is an integral membrane.

Figure 8:
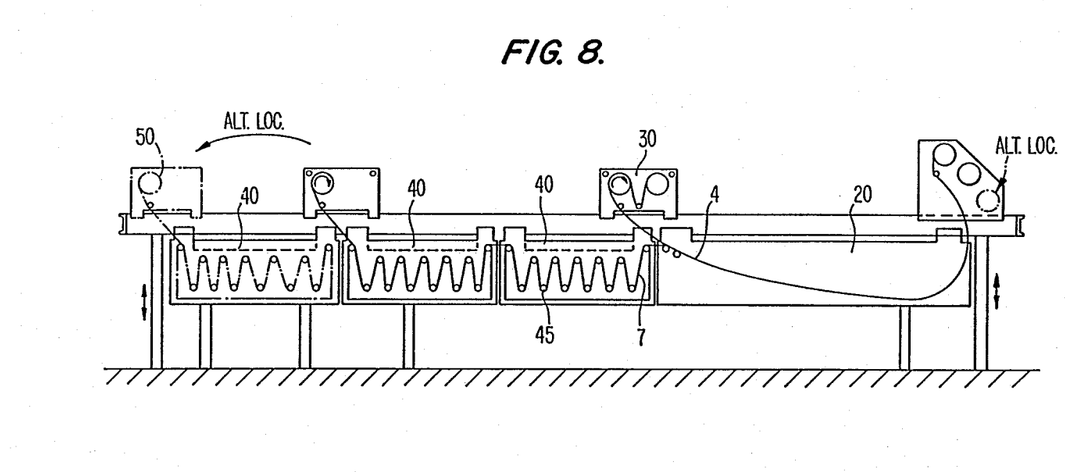
FIG. 8 is a schematic illustration of the casting, coagulation, and washing bath sections of an apparatus usable in preparing microporous asymmetric polyamide membranes in accordance with the teachings of this invention.

The composite is coagulated by immersion in a coagulation bath 20 of about 38% formic acid in an aqueous solution at from about 25° C. to about 30° C. for at least 30 seconds, preferably from about 60 seconds to about 90 seconds. An increased formic acid concentration of the coagulation bath results in a more porous and less dense membrane, while a decreased formic acid concentration results in a less porous and more dense membrane. The coagulation bath solution is constantly recirculated in a direction countercurrent to the movement of the composite membrane.

The coagulated membrane 7 is then separated from the continuous, moving solid support 4 in the separation zone 30, illustrated in FIG. 8. The separated coagulated membrane continues on through a washing bath zone, and the continous moving solid support is cleaned for reuse.

The separated coagulated membrane goes directly to washing bath 40, where the membrane is washed in water maintained at from about 25° C. to about 30° C. The washing bath may consist of several zones, with each successive zone containing water with a greater degree of purity. The result of this is that the membrane as it exits the last washing zones is washed in essentially pure water, i.e. water substantially free of coagulation bath and casting residues.

The water bath zones contain water bearings 45. The membrane travels over these water bearings following a zig-zag path while the recirculating water washes the membrane.

Figure 9:
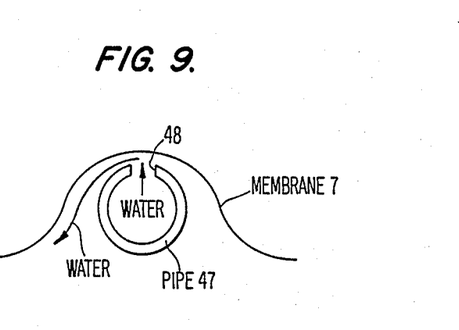
FIG. 9 is a detailed schematic illustration of a "water bearing" usable in the washing bath section of the apparatus of FIG. 8.

An example of water bearings used in the water baths is shown in detail in FIG. 9. The water bearing is essentially a pipe 47 with a slit, 48, on the side facing the membrane. Those water bearings shown in the upper row of FIG. 8 would have the slit at the top of the pipe while those in the lower row would have a slit in the bottom of the pipe. Water flows through the pipe and exits by means of the slit. This enables the membrane 7, to essentially "float" over the water bearing and thus eliminate those conditions conducive to tearing or stretching of the coagulated membrane.

The membrane is then removed from the water bath and wound on a roller 50. The clean membrane is then dried, using conventional means such as a drying frame or a hot drum.

The pore sizes of the membrane of the invention can be precisely controlled by changing the composition of polyamide material solution, the solids content, the alcohol concentration, the water concentration, the post-treatment conditions, and the composition of the coagulation bath.

In order that those skilled in the art can more fully understand this invention, the following examples are set forth. These examples are given solely for the purpose of illustrating the invention, and should not be considered as expressing limitations unless so set forth in the appended claims. All parts and percentages are by weight, unless otherwise stated.

EXAMPLE 1

A 1-liter, 4-inch diameter glass vessel with a glass jacket, equipped with a stainless steel stirrer with two 1½ inch agitator blades, was used to dissolve and prepare the polyamide solution. In this vessel, 165 grams of dry polyamide 6/6 pellets (70% by weight Monsanto Vydyne 66B, 30% by weight DuPont Zytel 3071) were slowly added to 591.2 grams of a solvent system containing 85.7% of 96% formic acid, 0.8% anhydrous lithium chloride, and 13.5% isopropanol, over a period of three hours at 45° C. while mixing at a speed of 250 rpm. The resulting solution's viscosity at 45° C. was approximately 9000 centipoise. 243.8 grams of a solvent system, consisting of 65.3% by weight water, 26.6% of 96% formic acid, and 8.1% anhydrous lithium chloride, was heated to 65° C. and added to the surface of the above prepared solution, also heated to 65° C. at a rate of 10 grams/minute through two 0.2 mm nozzles pressured by a peristaltic pump. These nozzles were located two inches above the solution surface and directed over the vortex created by the mixing rate of 250 rpm.

The resulting solution had a composition of 16.5% polyamide 6/6, 2.5% lithium chloride, 56.0% formic acid, 17.0% water, and 8.0% isopropanol with a solution viscosity at 55° C. of approximately 1400 centipoise.

Membrane was produced from a 0.010″ thick solution cast onto a glass plate using a Gardner Casting Bar by coagulation in a 38% by weight formic acid solution. Opacity of the forming membrane increased until a point was reached, around 30–35 seconds, after which time no discernible change occurred. The coagulated membrane was removed from the formic acid coagulating solution after 15 minutes, washed overnight in deionized water and subsequently dried. The following physical properties were recorded:

| thickness | .0035–.0045″ |
|---|---|
| water flux (at 10 psi) | 3.0–4.0 ml/min/cm$^2$/psi |
| initial bubble point (in water) | 25 psi |
| foam all over point (in water) | 26–30 psi |

These results indicate a range of pores up to 0.65 microns diameter.

EXAMPLE 2

The solution composition of example 1 was post-treated in two steps, the first a cooling step and then a second, heating step. Compressed air used as a cooling medium was passed through the solution vessel jacket and the homogeneous solution prepared in example 1 cooled to 38° C. at a rate of 0.33° C./minute at a stirring rate of 50 rpm until a heterogeneous solution slurry was formed. This heterogeneous solution had high turbidity and a light absorbence of 1.3–1.4 at 430 nm was recorded on a Bausch & Lomb Spectronic 20. While still stirring, this slurry was then immediately reheated by recirculating hot water, starting at 60° C. and then continually increasing to 75° C., through the vessel jacket. A 1000 grams batch over a 70 minute period was warmed to 70° C. (temperature recorded at wall of vessel). At this point, the solution showed only slight degree of turbidity, displaying a light absorbence of 0.3–0.4 at 430 nm.

A membrane formed with this post-treated solution, using the same procedure and with same coagulating solution of example 1, was produced more rapidly. Opacity of the forming membrane increased until a point was reached, around 20–25 seconds, after which time no discernible change occurred. The coagulated membrane was removed from the formic acid coagulating solution after 15 minutes, washed overnight in deionized water, and subsequently dried. The following physical properties were recorded.

| thickness | .0035–.0045″ |
|---|---|
| water flux (at 10 psi) | 1.4–1.6 ml/min/cm$^2$/psi |
| initial bubble point (in water) | 50–54 psi |
| foam all over point (in water) | 60–68 psi |

These results indicate a range of pores only up to 0.2 microns diameter, much smaller than the membrane produced in example 1.

EXAMPLE 3

In this example, the solution materials composition, preparation, and state, are identical to that shown in example 1 with the single exception that 100% of the polyamide 6/6 used was Monsanto Vydyne 66B. A higher average molecular weight is evident with this casting solution.

Using identical solution casting procedures and coagulating medium shown in example 1, the rate of membrane formation was also similar to that shown in example 1. Opacity of the forming membrane increased until a point was reached, around 30–35 seconds, after which time no discernible change occurred. The coagulated membrane was removed from the formic acid coagulating solution after 15 minutes, washed overnight in deionized water, and subsequently dried. The following physical properties were recorded:

| thickness | .0035–.0040″ |
|---|---|
| water flux (at 10 psi) | 1.6–1.9 ml/min/cm$^2$/psi |
| initial bubble point (in water) | 28–30 psi |
| foam all over point (in water) | 33–38 psi |

These results indicate a membrane similar to those produced in example 1.

EXAMPLE 4

In this example, the solution materials composition and preparations are as shown in example 3 with the addition, however, of the identical solution post-treatment shown in example 2.

Using identical solution casting procedures and coagulating medium shown in example 1, the rate of membrane formation was similar to that shown in example 2, and faster than both membranes produced in examples 1 and 3. Opacity of the forming membrane increased until a point was reached, around 20–25 seconds, after which time no discernible change occurred. The coagulated membrane was removed from the formic acid coagulating solution after 15 minutes, washed overnight in deionized water, and subsequently dried. The following physical properties were recorded:

| thickness | .0035–.0040″ |
|---|---|
| water flux (at 10 psi) | 1.4–1.6 ml/min/cm$^2$/psi |
| initial bubble point (in water) | 50 psi |
| foam all over point (in water) | 54–58 psi |

These results indicate a membrane similar to those produced in example 2.

EXAMPLE 5

A fabric supported asymmetric membrane was prepared on a casting machine in a continuous run.

First and second polyamide 6/6 solutions were prepared in a semi-continuous process with final material compositions identical to that shown in examples 3 and 4.

Into a stirred, 25–50 rpm, heated 15-liter vessel, 2,475 grams of Monsanto Vydyne 66B was added to 8868 grams of a solvent system containing 85.7% of 56% formic acid, 0.8% of anhydrous lithium chloride, and 13.5% of isopropanol, maintained at about 45°–50° C. over a period of 2 hours.

A portion of this master batch was transferred over to a second vessel, stirred at 250 rpm and heated to 65° C., to which was added 3657 grams of a solvent system, also at 65° C., consisting of 65.3% water, 26.6% formic acid, and 8.1% anhydrous lithium chloride. The solvent system was added at a rate of 52.3 grams/minute by spraying onto the surface of the first solution. When the desired composition was achieved, i.e.,

| Component | Weight Percent |
|---|---|
| Vydyne 66B | 16.5 |
| formic acid | 56.0 |
| water | 17.0 |
| lithium chloride | 2.5 |
| isopropanol | 8.0 | the remaining portion of the master batch was then introduced into this second mixing vessel at a rate of 162.5 grams/minute while continuing to add the solvent system at 52.3 grams/minute. 214.8 grams/minute of clear polymer solution with the above composition, was continuously produced while maintaining an average residual time of about 20 to 30 minutes in the mixing vessel.

This solution was separated into two fractions. The first solution was used as produced and introduced directly onto the casting machine as the saturant solution. The second solution was post-treated. Post-treatment consisted of pumping the warm solution, at about 55° to 60° C. through a jacketed and stirred tubular reactor such as the one depicted in FIG. 6. The solution was cooled in the first reactor zone to about 25° C. at an average rate of about 3° to 4° C./minute, reheated in the second reactor zone to 55°–60° C. at an average rate of 3–4° C./minute.

Turbidity of Solution B is approximately that shown by the solution in example 4, with a light absorbence of 0.3–0.4 at 430 nm. This was reduced from the higher turbidity with an estimated light absorbence of 1–2 at 430 nm, observed at the end of the cooling zone of the tube reactor.

The first solution was deposited on a 0.007 inch thick polyester film solid continuous moving support. An Eaton Dikeman Hollytex 3256 non-woven polyester fabric, ranging from about 0.0025 to 0.003 inch thick, was laid on and worked into the first solution. The second post-treated solution was cast directly onto the first solution layer/fabric composite. The resultant composite was pulled on and by the polyester film solid support through a coagulation bath containing 38% formic acid in water. After emerging from the coagulation bath, the coagulated membrane was separated from the solid support. The fabric supported membrane was then washed free of residual coagulating solution.

The membrane produced after drying showed the following physical properties:

| thickness | .007–.008" |
|---|---|
| water flux | 1 ml/min/cm²/psi |
| bubble point (in water) | 45 psi |
| foam all overpoint (in water) | 50 psi |

These results indicate a range of pores up to about 0.25 microns in diameter.

The above discussion of this invention is directed primarily to preferred embodiments and practices thereof. It will be readily apparent to those skilled in the art that further changes and modifications in the actual implementation of the concepts described herein can be made without departing from the spirit and scope of the invention as defined by the following claims.

We claim:

1. An integral/ gradient, skinned, submicrosopically porous, anisotropic, hydrophilic, asymmetric polyamide membrane comprising:
   (a) a first porous polyamide zone obtained from a polyamide solution,
   (b) a fabric support imbedded in the first porous polyamide zone, and
   (c) a second porous polyamide zone having a skinned outer surface, obtained from a polyamide solution having the same constituents as the solution used to form the first porous polyamide zone but post-treated to give pores substantially smaller than those in the first porous polyamide zone.

2. A membrane as recited in claim 1 of from about 0.002 to about 0.050 inch in overall thickness.

3. A membrane as recited in claim 1 in which the first porous polyamide zone comprises a relatively open, discontinuous polyamide zone with pores approximately 5 to 100 times larger than those in the second porous polyamide zone, and the second porous polyamide zone is from about 10 to about 500 microns (from about 0.0004 to about 0.020 inches) in overall thickness and has surface pores whose maximum average diameter is from about 0.001 to 1.0 microns.

4. A membrane as recited in claim 1 in which the fabric support is a coarsely porous polymer structure through which fluid can pass with little hydraulic resistance.

5. A membrane as recited in any one of claims 1–4 in which the polyamide is nylon 6/6 and the fabric support is a calendared spun bonded polyethylene terephthalate fabric.

6. A process for the preparation of an integral gradient, skinned submicroscopically porous, anisotropic, hydrophilic, asymmetric polyamide membrane which comprises:
   (a) casting a layer of a first polyamide solution onto a moving, continuous solid support,
   (b) imbedding a fabric support into the first polyamide solution layer,
   (c) casting a layer of a second polyamide solution post-treated to give pores substantially smaller than those in the first polyamide solution layer onto the first polyamide solution/fabric support composite,
   (d) coagulating the resultant composite to form a membrane,
   (e) separating the membrane from the solid support, and
   (f) washing the separated membrane.

7. The process of claim 6 wherein the first polyamide solution and the second polyamide solution comprise from about 14 weight % to about 18 weight % polyamide, from about 55 weight % to about 57 weight % formic acid, from about 16 weight % to about 18 weight % water, from 7 weight % to about 9 weight % aliphatic alcohol and from about 1.5 weight % to about 3.5 weight % salt.

8. The process of claim 7 wherein the aliphatic alcohol is isopropanol and the salt is lithium chloride.

9. The process of claim 6 wherein the composite is coagulated by immersion in a coagulation bath comprising from about 35 weight % to about 40 weight % formic acid and from about 60 weight % to about 65 weight % water.

10. The process of claim 6 wherein the fabric support is a coarsely porous polymer structure through which fluid can pass with little hydraulic resistance.

11. The process of claim 6 wherein polyamide is nylon 6/6 and the fabric support is a calendared spun bonded polyethylene terephthalate fabric.

12. The process of claim 6 wherein the second polyamide solution is post-treated by cooling the polyamide solution until a precipitate forms and heating until the precipitate dissolves.

* * * * *